United States Patent Office 3,254,051
Patented May 31, 1966

3,254,051
PROCESS OF PREPARING POLYCARBONATES BY CONTACTING A MONOCHLOROFORMATE WITH AN INSOLUBLE CROSSLINKED COPOLYMER CONTAINING QUATERNARY AMMONIUM GROUPS
John A. Schmitt, Midland, Mich., assignor to The Dow Chemical Company, Midland, Mich., a corporation of Delaware
No Drawing. Filed Dec. 20, 1962, Ser. No. 246,008
20 Claims. (Cl. 260—47)

This invention relates to a new process for the production of polymeric materials. More particularly, this invention is concerned with the manufacture of solid polycarbonates.

Among the newer important synthetic plastic polymers are the polycarbonates. These are condensation polymers in which the organic moieties are joined together by carbonate linkages. Polycarbonates are excellent molding materials as products made therefrom have high strength, toughness and heat stability. Polycarbonates are, however, difficult to manufacture. A usual technique for the production of polycarbonate materials requires the phosgenation of an organic dihydroxy compound in a two-phase heterogeneous system containing aqueous caustic and an organic solvent. Often, an emulsion or gel is formed and thick mixtures result which, at best, are difficult to handle. In addition, large quantities of salt, caustic and water become suspended in the polymer and these are difficult to remove. Furthermore, catalysts are found necessary in the above-mentioned processes and their introduction and removal causes further difficulties.

It is, therefore, among the objects of the present invention to provide a new process for the production of solid polycarbonates.

A further object of the present invention is the provision of a novel process for the production of solid polycarbonates which avoids the above-mentioned and other difficulties. Another object of the present invention is the provision of an economical process which possesses many advantages as will appear from the description thereof which follows.

According to the present invention, solid polycarbonates are prepared by bringing a solution of a monochloroformate of an aromatic dihydroxy compound into contact with certain insoluble resinous materials, namely, the hydroxide form of a quaternary ammonium anion exchange resin, separating the polycarbonate solution thus formed from the insoluble resinous material, and recovering the solid polycarbonate from the solution.

The monochloroformate employed in the process of this invention can be produced from a rather large variety of organic dihydroxy compounds. Representative specific examples of such aromatic dihydroxy compounds are Hydroquinone,
Resorcinol,
Pyrocatechol,
4,4'-dihydroxydiphenyl,
2,2'-dihydroxydiphenyl,
1,4-dihydroxynapthalene,
1,6-dihydroxynaphthalene,
2,6-dihydroxynaphthalene,
1,2-dihydroxynaphthalene,
1,5-dihydroxynaphthalene,
Dihydroxyanthracene,
2,2'-dihydroxydinaphthyl-1,1' and
Ortho-, meta- and para-hydroxybenzyl alcohol.

Among the monochloroformates of aromatic dihydroxy compounds, the monochloroformates of di-(hydroxyaryl) alkanes and the di(hydroxyaryl)sulfones are found to be particularly satisfactory. Examples of this class of compounds are the monochloroformates of Di(4-hydroxyphenyl)methane,
1,1-di(4-hydroxyphenyl)ethane,
1,1-di(4-hydroxyphenyl)propane,
1,1-di(4-hydroxyphenyl)butane,
1,1-di(4-hydroxyphenyl)-2-methylpropane,
1,1-di(4-hydroxyphenyl)heptane and
1,1-di(4-hydroxyphenyl)-1-phenylmethane.

Furthermore,

Di(4-hydroxyphenyl)-4-methylphenylmethane,
Di(4-hydroxyphenyl)-4-ethylphenylmethane,
Di(4-hydroxyphenyl)-4-isopropylphenylmethane,
Di(4-hydroxyphenyl)-4-butylphenylmethane,
Di(4-hydroxyphenyl)benzylmethane,
Di(4-hydroxyphenyl)-α-furylmethane,
2,2-di(4-hydroxyphenyl)-propane,
2,2-di(4-hydroxyphenyl)butane,
2,2-di(4-hydroxyphenyl)pentane,
2,2-di(4-hydroxyphenyl)-4-methylpentane,
2,2-di(4-hydroxyphenyl)heptane,
2,2-di(4-hydroxyphenyl)octane,
2,2-di(4-hydroxyphenyl)nonane,
1,1-di(4-hydroxyphenyl)-1-phenylethane,
3,3-di(4-hydroxyphenyl)pentane,
4,4-di(4-hydroxyphenyl)heptane,
1,1-di(4-hydroxyphenyl)cyclopentane,
1,1-di(4-hydroxyphenyl)cyclohexane,
2,2-di(4-hydroxyphenyl)decahydronaphthalene,
2,2-di(4-hydroxycyclohexyl)propane,
2-(4-hydroxy-3-methylphenyl)-2-(4-hydroxyphenyl)-propane,
2-(4-hydroxy-3-isopropylphenyl)-2-(4-hydroxyphenyl)-butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.butylphenyl)ethane,
1,1-di(4-hydroxy-3-methyl-6-tert.butylphenyl)propane,
1,1-di(4-hydroxy-3-methyl-6-tert,butylphenyl)butane,
1,1-di(4-hydroxy-3-methyl-6-tert.butylphenyl)isobutane,
1,1-di(4-hydroxy-3-methyl-6-tert.butylphenyl)heptane,
1,1-di(4-hydroxy-3-methyl-6-tert.butylphenyl)-1-phenylethane,
1,1-di(4-hydroxy-3-methyl-6-tert.butylphenyl)-2-methylpentane,
1,1-di(4-hydroxy-3-methyl-6-tert.butylphenyl)-2-ethylhexane,
1,1-di(4-hydroxy-3-methyl-6-tert.amylphenyl)butane,
Di(4-hydroxyphenyl)sulphone,
Di(2-hydroxyphenyl)sulphone,
Di(3-hydroxyphenyl)sulphone,
Di(4-hydroxy-2-methylphenyl)sulphone,
Di(4-hydroxy-3-methylphenyl)sulphone,
Di(2-hydroxy-4-methylphenyl)sulphone,
Di(4-hydroxy-2-ethylphenyl)sulphone,
Di(4-hydroxy-3-ethylphenyl)sulphone,
Di(4-hydroxy-2-tert.butylphenyl)sulphone,
Di(4-hydroxy-3-tert.butylphenyl)sulphone and
Di(2-hydroxynaphthyl)sulphone.

Among the monochloroformates of di(hydroxyaryl)-alkanes, given above, the di(4-hydroxyphenyl)alkanes are preferable, especially the monochloroformate of 2,2-di-(4-hydroxyphenyl)propane. Polymers having special properties can be prepared from mixtures of two or more monochloroformates of aromatic dihydroxy compounds.

In the practice of the process of the present invention, the monochloroformate of an aromatic dihydroxy compound is utilized as indicated above. The above referred-to monochloroformates can be obtained by phosgenating an aqueous solution or suspension containing substantially equimolecular proportions of an alkali metal or alkaline earth metal hydroxide and the aromatic dihydroxy compound corresponding to the monochloroformate desired to be obtained. The following specific example is illustrative of the process for obtaining monochloroformates of aromatic dihydroxy compounds suitable for use in the process of the present invention.

*Example A*

One gram-mole of 2,2-di(4-hydroxyphenyl)propane is dissolved together with one gram-mole of sodium hydroxide to form an aqueous solution having a temperature of about 30° C. As phosgene gas is bubbled into the solution, a precipitate forms until the solution becomes neutral and about one gram-mole of phosgene gas is consumed. The precipitate is recovered by filtration, washed with water until free of salts and dried in air to a low density white powder which is found upon analysis to be the monochloroformate of 2,2-di(4-hydroxyphenyl)propane.

In a manner similar to Example A, monochloroformates of other aromatic dihydroxy compounds can be obtained by substituting, for the 2,2-di(4-hydroxyphenyl)-propane employed in Example A, an equimolecular proportion of an aromatic dihydroxy compound corresponding to the monochloroformate it is desired to obtain and proceeding with the phosgenation substantially as set forth in Example A.

The insoluble resinous material referred to above is an insoluble, resinous, quaternary ammonium composition having a plurality of quaternary ammonium groups substituted on a cross-linked resin which is a copolymer made from a mixture of an aromatic monovinyl hydrocarbon and an aromatic divinyl hydrocarbon, the mixture containing a predominant amount of the monovinyl hydrocarbon, advantageously from 60 percent to 99.9 percent on a molar basis. The copolymer contains, on the aromatic nuclei, substituent groups having the general formula

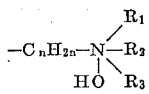

in which n has a value from one to four and $R_1$, $R_2$ and $R_3$ represent monovalent hydrocarbon groups, the number of said substituent groups,

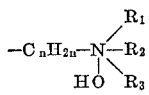

being at least one for every 15 aromatic nuclei and, beneficially, from three to six for every four aromatic nuclei in the copolymer. The class of aromatic monovinyl hydrocarbon is typified by the following: styrene, ortho- meta- and para-methyl styrenes, ortho-, meta- and para-ethyl styrenes, vinyl naphthalene, vinyl anthracene and the homologs of the above. While divinyl benzene is the divinyl hydrocarbon of first choice, others which are operable include divinyl toluenes, divinyl naphthalenes, divinyl ethyl benzenes and divinyl xylenes.

As stated above, each of $R_1$, $R_2$ and $R_3$ is a monovalent hydrocarbon group devoid of aliphatic unsaturation. Each hydrocarbon group can be an alkyl group, aryl group, cycloalkyl group or an aralkyl group. The hydrocarbon groups can be all alike, two alike and the third different or all three can be different. Representative illustrative examples of suitable hydrocarbon groups are methyl, ethyl, propyl, isopropyl, butyl, isobutyl, tertiary butyl, pentyl, hexyl, cyclohexyl, phenyl, benzyl and the like. A specific example of such a copolymer useful in the process of the present invention is an insoluble, resinous, quaternary ammonium, cross-linked copolymer of a mixture containing 99 percent styrene and 1 percent divinyl benzene, the copolymer containing, on the aromatic nuclei, substituent groups having the general formula $-CH_2-N(CH_3)_3OH$ the number of such groups being from three to six for every four benzene rings in the copolymer. The insoluble copolymer is preferably in the form of small pieces, globules, spheroids or beads ranging in size from 5 to 325 mesh. Extremely fine particles of approximately 40 to 150 microns in diameter are also useful for the process of this invention.

In the process of the present invention, the monochloroformate of the aromatic dihydroxy compound is dissolved in a solvent which is also a solvent for the polycarbonate to be formed, and the solution is brought into contact with the quaternary ammonium copolymer described above. This contact can be brought about in a suitable manner such as mixing beads of the quaternary ammonium copolymer with the solution of monochloroformate of the aromatic dihydroxy compound and after the reaction is complete, separating the solution of the polycarbonate from the quaternary ammonium copolymer by filtration or decantation. Alternatively, the solution of the monochloroformate can be passed through a column packed with beads or pieces of the quaternary ammonium copolymer, the solution being introduced at one end and recovered at the other end. The polycarbonate is recovered from its solvent in any appropriate manner as by precipitation achieved by pouring the solution into a large volume of non-solvent for the polymer or by vaporization of the solvent under the influence of heat and/or vacuum.

The solvent employed in the practice of this invention should be a solvent for both the monochloroformate of the aromatic dihydroxy compound and for the polycarbonate product but must be non-reactive with either compound, i.e., non-reactive with hydroxy or chloroformoxy groups. Many such solvents are known. Among these, the class of chlorinated aliphatic compounds can be employed although others can be utilized. Representative examples of chlorinated aliphatic liquids which can be employed in the process of the present invention are chloroform, methylene chloride, symmetrical tetrachloroethane, cis-1,2-dichloroethylene, 1,1,2-trichloroethane and 1,2-dichloroethane. In addition, there can be used thiophene, dioxane and tetrahydrofuran.

The process of this invention can be carried out at room temperature or below, but it is advantageously carried out at slightly elevated temperatures, for example, about 25° C. Care should be taken that the temperature is not raised too far, for example, not beyond about 50° C. Sufficient time should be allowed for the polycarbonate to attain the desired molecular weight and may vary from a few minutes to several hours. An adequate amount of solvent should be employed to give a polycarbonate solution of convenient viscosity to enable its separation from the quaternary ammonium copolymer. The quaternary ammonium copolymer is chemically changed by the reaction to the chloride form and should be present in at least a stoichiometric amount in relation to the amount of monochloroformate employed. Preferably, an excess of the quaternary ammonium copolymer is utilized. The quaternary ammonium copolymer can be regenerated to its original hydroxide form with aqueous sodium hydroxide. The process of this invention lends itself to the formation of both homopolymers and copolymers, the former being prepared by employing a solution of a single monochloroformate and the latter by mixtures of two or more monochloroformates of aromatic dihydroxy compounds.

Throughout this specification, parts and percentages are parts and percentages by weight unless otherwise specified. In the example which follows, there is given a preferred procedure by which the present invention can be carried out.

Example B

Five grams of the monochloroformate of 2,2-di(4-hydroxyphenyl)propane is dissolved in 40 milliliters of methylene chloride and placed in a 4 ounce bottle. There are then placed in the bottle thirty milliliters of dry beads of an insoluble, cross-linked, resinous, quaternary ammonium copolymer of a mixture containing 99 percent syrene and 1 percent divinyl benzene having substituent groups of the formula —$CH_2$—$N(CH_3)_3OH$ on the aromatic nuclei, the number of such substituent groups being one for every benzene ring in the copolymer. The bottle is then capped and shaken for six hours. The solution becomes more viscous but no gels form. The solution of the polycarbonate is separated from the insoluble quaternary ammonium copolymer by decantation and the polycarbonate recovered by evaporation of the methylene chloride. The polycarbonate has a Fikentscher "K" value (K=1,000) of 59 and a molecular weight of about 70,000.

In a manner similar to the foregoing example, any of the other quaternary ammonium hydroxide copolymer resins can be substituted for the particular quarternary ammonium hydroxide resin employed therein with similar results. In a like manner, solid polycarbonates can be produced by substituting any of the class of aromatic monochloroformate monohydroxy compounds or mixtures thereof, given herein for the one utilized in Example B. Similarly, any of the solvents within the class referred to above can be substituted for the methylene chloride employed in Example B with good results.

That which is claimed is:

1. A process for the production of solid polycarbonates which comprises contacting a solution of a monochloroformate of an aromatic dihydroxy compound with an insoluble cross-linked copolymer of a mixture of an aromatic monovinyl hydrocarbon and of an aromatic divinyl hydrocarbon, said mixture containing a predominant amount of said monovinyl hydrocarbon, said copolymer containing on the aromatic nuclei substituent groups having the general formula

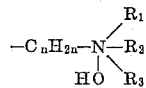

in which $n$ has a value of one to four, $R_1$, $R_2$ and $R_3$ represent monovalent hydrocarbon groups, the number of said substituent groups being at least one for every 15 aromatic nuclei in said copolymer.

2. A process for the production of solid polycarbonates which comprises contacting a solution of a monochloroformate of an aromatic dihydroxy compound with an insoluble cross-linked copolymer of a mixture of an aromatic monovinyl hydrocarbon and of an aromatic divinyl hydrocarbon, said mixture containing from 60 percent to 99.9 percent on a molar basis of said monovinyl hydrocarbon, said copolymer containing on the aromatic nuclei substituent groups having the general formula

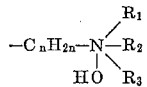

in which $n$ has a value of one to four, $R_1$, $R_2$ and $R_3$ represent monovalent hydrocarbon groups, the number of said substituent groups being at least one for every 15 aromatic nuclei in said copolymer.

3. A process for the production of solid polycarbonates which comprises contacting a solution of a monochloroformate of an aromatic dihydroxy compound with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

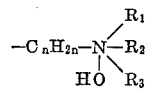

in which $n$ has a value of one to four, $R_1$, $R_2$ and $R_3$ represent monovalent hydrocarbon groups, the number of said substituent groups being from three to six for every four aromatic nuclei in said copolymer.

4. A process for the production of solid polycarbonates which comprises contacting a solution of a monochloroformate of an aromatic dihydroxy compound with an insoluble cross-linked copolymer of a mixture of from 60 percent to 99.9 percent styrene and an aromatic divinyl hydrocarbon, said copolymer containing on the aromatic nuclei substituent groups having the general formula:

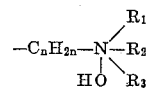

in which $n$ has a value of one to four, $R_1$, $R_2$ and $R_3$ represent monovalent hydrocarbon groups, the number of said substituent groups being at least one for every 15 aromatic nuclei in said copolymer.

5. A process for the production of solid polycarbonates which comprises contacting a solution of a monochloroformate of an aromatic dihydroxy compound with an insoluble cross-linked copolymer of a mixture of an aromatic monovinyl hydrocarbon and divinyl benzene, said mixture containing a predominant amount of said monovinyl hydrocarbon, said copolymer containing on the aromatic nuclei substituent groups having the general formula

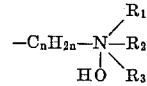

in which $n$ has a value of one to four, $R_1$, $R_2$ and $R_3$ represent monovalent hydrocarbon groups, the number of said substituent groups being at least one for every 15 aromatic nuclei in said copolymer.

6. A process for the production of solid polycarbonates which comprises contacting a solution of a monochloroformate of an aromatic dihydroxy compound with an insoluble cross-linked copolymer of a mixture from 60 percent to 99.9 percent of styrene and from 40 percent to 0.1 percent of divinyl benzene, said copolymer containing on the aromatic nuclei substituent groups having the general formula

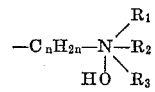

in which $n$ has a value of one to four, $R_1$, $R_2$ and $R_3$ represent monovalent hydrocarbon groups, the number of said substituent groups being at least one for every 15 aromatic nuclei in said copolymer.

7. A process for the production of solid polycarbonates which comprises contacting a solution of a monochloroformate of an aromatic dihydroxy compound with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

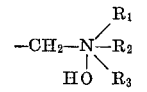

in which $R_1$, $R_2$ and $R_3$ represent monovalent hydrocarbon groups, the number of said substituent groups being at least one for every 15 aromatic nuclei in said copolymer.

8. A process for the production of solid polycarbonates which comprises contacting a solution of a monochloroformate of an aromatic dihydroxy compound with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the formula —C$_n$H$_{2n}$—N(CH$_3$)$_3$OH in which $n$ has a value of one to four, the number of said substituent groups being at least one for every 15 aromatic nuclei in said copolymer.

9. A process for the production of solid polycarbonates which comprises contacting a solution of a monochloroformate of an aromatic dihydroxy compound with an insoluble cross-linked copolymer of a mixture of an aromatic monovinyl hydrocarbon and 1 percent divinyl benzene, said copolymer containing on the aromatic nuclei substituent groups having the general formula

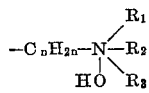

in which $n$ has a value of one to four, R$_1$, R$_2$ and R$_3$ represent monovalent hydrocarbon groups, the number of said substituent groups being at least one for every 15 aromatic nuclei in said copolymer.

10. A process for the production of solid polycarbonates which comprises contacting a solution of a monochloroformate of an aromatic dihydroxy compound with an insoluble cross-linked copolymer of a mixture of about 99 percent styrene and about 1 percent divinyl benzene, said copolymer containing on the aromatic nuclei substituent groups having the formula

—CH$_2$—N(CH$_3$)$_3$OH the number of said substituent groups being from three to six for every four benzene rings in said copolymer.

11. A process for the production of solid polycarbonates which comprises contacting a solution of a monochloroformate of an aromatic dihydroxy compound in a chlorinated aliphatic hydrocarbon with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

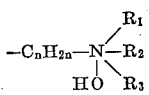

in which the $n$ has a value of one to four, R$_1$, R$_2$ and R$_3$ represent monovalent hydrocarbon groups, the number of said substituent groups being at least one for every 15 aromatic nuclei in said copolymer.

12. A process for the production of solid polycarbonates which comprises contacting a solution of a monochloroformate of an aromatic dihydroxy compound in methylene chloride with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei sumstituent groups having the general formula

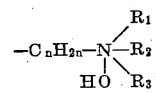

in which $n$ has a value of one to four, R$_1$, R$_2$ and R$_3$ represent monovalent hydrocarbon groups, the number of said substituent groups being at least one for every 15 aromatic nuclei in said copolymer.

13. A process for the production of solid polycarbonates which comprises contacting a solution of a monochloroformate of a di(hydroxyaryl)alkane with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

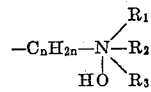

in which $n$ has a value of one to four, R$_1$, R$_2$ and R$_3$ represent monovalent hydrocarbon groups, the number of said substituent groups being at least one for every 15 aromatic nuclei in said copolymer.

14. A process for the production of solid polycarbonates which comprises contacting a solution of a monochloroformate of a di(4-hydroxyphenyl)alkane with an insoluble cross-linked copolymer of a mixture of an aromatic monovinyl hydrocarbon and an aromatic divinyl hydrocarbon and said mixture containing a predominant amount of said monovinyl hydrocarbon, said copolymer containing on the aromatic nuclei substituent groups having the general formula

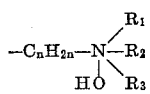

in which $n$ has a value of one to four, R$_1$, R$_2$ and R$_3$ represent monovalent hydrocarbon groups, the number of said substituent groups being at least one for every 15 aromatic nuclei in said copolymer.

15. A process for the production of solid polycarbonates which comprises contacting a solution of a monchloroformate of 2,2-di(4-hydroxyphenyl)propane with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

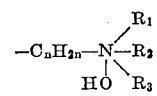

in which $n$ has a value of one to four, R$_1$, R$_2$ and R$_3$ represent monovalent hydrocarbon groups, the number of said substituent groups being at least one for every 15 aromatic nuclei in said copolymer.

16. A process for the production of solid polycarbonates which comprises contacting a methylene chloride solution of a monochloroformate of 2,2-di(4-hydroxyphenyl)propane with an insoluble cross-linked copolymer of a mixture of an aromatic monovinyl hydrocarbon and an aromatic divinyl hydrocarbon, said mixture containing a predominant amount of said monovinyl hydrocarbon, said copolymer containing on the aromatic nuclei substituent groups having the general formula

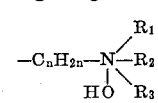

in which $n$ has a value of one to four, R$_1$, R$_2$ and R$_3$ represent monovalent hydrocarbon groups, the number of said substituent groups being at least one for every 15 aromatic nuclei in said copolymer.

17. A process for the production of solid polycarbonates which comprises contacting a methylene chloride solution of a monochloroformate of 2,2-di(4-hydroxyphenyl)propane with an insoluble cross-linked copolymer of a mixture of an aromatic monovinyl hydrocarbon and an aromatic divinyl hydrocarbon, said mixture containing from about 60 percent to 99.9 percent of said monovinyl hydrocarbon, said copolymer containing on the aromatic nuclei substituent groups having the general formula

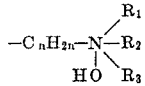

in which $n$ has a value of one to four, $R_1$, $R_2$ and $R_3$ represent monovalent hydrocarbon groups, the number of said substituent groups being at least one for every 15 aromatic nuceli in said copolymer.

18. A process for the production of solid polycarbonates which comprises contacting a methylene chloride solution of a monochloroformate of 2,2-di(4-hydroxyphenyl)propane with an insoluble cross-linked copolymer of a mixture of an aromatic monovinyl hydrocarbon and divinyl benzene, said mixture containing a predominant amount of said monovinyl hydrocarbon, said copolymer containing on the aromatic nuclei substituent groups having the general formula

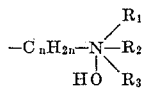

in which $n$ has a value of one to four, $R_1$, $R_2$ and $R_3$ represent monovalent hydrocarbon groups, the number of said substituent groups being at least one for every 15 aromatic nuclei in said copolymer.

19. A process for the production of solid polycarbonates which comprises contacting a methylene chloride solution of a monochloroformate of 2,2-di(4-hydroxyphenyl)propane with an insoluble cross-linked copolymer of a mixture of about 99 percent styrene and about 1 percent divinyl benzene, said copolymer containing on the aromatic nuclei substituent groups having the general formula

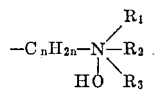

in which $n$ has a value of one to four, $R_1$, $R_2$ and $R_3$ represent monovalent hydrocarbon groups, the number of said substituent groups being at least one for every 15 aromatic nuclei in said copolymer.

20. A process for the production of solid polycarbonate resins which comprises contacting a methylene chloride solution of the monochloroformate of 2,2-di(4-hydroxyphenyl)propane with an insoluble cross-linked copolymer of a mixture of about 99 percent styrene and about 1 percent divinyl benzene, and said copolymer containing on the benzene nuclei substituent groups having the formula

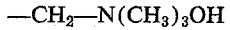

the number of said substituent groups being from three to six for every 4 nuclei in said copolymer.

References Cited by the Examiner

UNITED STATES PATENTS

| | | | |
|---|---|---|---|
| 3,043,800 | 7/1962 | Schnell et al. | 260—47 |
| 3,134,818 | 5/1964 | Farah et al. | 252—426 |
| 3,176,027 | 3/1965 | Budnowski et al. | 260—2 |

FOREIGN PATENTS

| | | |
|---|---|---|
| 849,081 | 9/1960 | Great Britain. |

OTHER REFERENCES

Dowex Ion Exchange, Dow Chemical Co., Midland, Mich., 1958, p. 73.

MURRAY TILLMAN, *Primary Examiner.*

J. T. GOOLKASIAN, *Assistant Examiner.*